(12) United States Patent
Nakamura et al.

(10) Patent No.: US 7,746,386 B2
(45) Date of Patent: Jun. 29, 2010

(54) IMAGE PICKUP DEVICE AND METHOD

(75) Inventors: Makibi Nakamura, Tokyo (JP); Hideho Une, Tokyo (JP); Yumi Sanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 939 days.

(21) Appl. No.: 10/954,308

(22) Filed: Oct. 1, 2004

(65) Prior Publication Data

US 2005/0088537 A1 Apr. 28, 2005

(30) Foreign Application Priority Data

Oct. 27, 2003 (JP) .................... P2003-365462

(51) Int. Cl.
*H04N 9/73* (2006.01)

(52) U.S. Cl. .................... 348/224.1; 348/342

(58) Field of Classification Search ... 348/222.1–225.1, 348/230, 362, 363, 355, 342
See application file for complete search history.

(56) References Cited

U.S. PATENT DOCUMENTS

| | | | | |
|---|---|---|---|---|
| 5,155,585 | A * | 10/1992 | Ishikawa | 348/360 |
| 5,235,428 | A * | 8/1993 | Hirota et al. | 348/355 |
| 5,282,022 | A * | 1/1994 | Haruki et al. | 348/223.1 |
| 5,398,058 | A * | 3/1995 | Hattori | 348/244.1 |
| 5,448,294 | A * | 9/1995 | Yamazaki | 348/230.1 |
| 5,619,260 | A * | 4/1997 | Miyadera | 348/223.1 |
| 5,648,818 | A * | 7/1997 | Fukatsu | 348/273 |
| 6,421,083 | B1 * | 7/2002 | Takakura | 348/223.1 |
| 6,930,723 | B1 * | 8/2005 | Tsuda et al. | 348/363 |
| 6,952,225 | B1 * | 10/2005 | Hyodo et al. | 348/223.1 |
| 7,199,830 | B1 * | 4/2007 | Tanaka et al. | 348/362 |
| 7,221,393 | B2 * | 5/2007 | Takakura | 348/223.1 |
| 7,265,781 | B2 * | 9/2007 | Noguchi | 348/223.1 |
| 2002/0018129 | A1 * | 2/2002 | Ikeda | 348/223 |
| 2002/0101516 | A1 * | 8/2002 | Ikeda | 348/223 |
| 2002/0171663 | A1 * | 11/2002 | Kobayashi et al. | 345/600 |

FOREIGN PATENT DOCUMENTS

| | | |
|---|---|---|
| EP | 0 429 992 A2 | 11/1990 |
| EP | 0 523 633 A1 | 7/1992 |
| JP | 2-86385 | 3/1990 |
| JP | 2751297 | 2/1998 |
| JP | 11-103464 | 4/1999 |
| JP | 11103464 A * | 4/1999 |

(Continued)

OTHER PUBLICATIONS

European Search Report; Application No./Patent No. 04256429.4-1241; Dated: Feb. 28, 2007.

(Continued)

*Primary Examiner*—Lin Ye
*Assistant Examiner*—Dennis Hogue
(74) *Attorney, Agent, or Firm*—Rader, Fishman & Grauer PLLC

(57) ABSTRACT

The present invention relates to an image pickup device including: a detecting unit for detecting a position of a filter for changing light separation; and a white balance controlling unit for performing white balance control on a basis of the position of the filter detected by the detecting unit.

14 Claims, 14 Drawing Sheets

FOREIGN PATENT DOCUMENTS

| | | |
|---|---|---|
| JP | 11-341502 | 12/1999 |
| JP | 11341502 A * | 12/1999 |
| JP | 2000-059798 | 2/2000 |
| JP | 2002-218481 | 8/2002 |
| JP | 2003-070009 | 3/2003 |

OTHER PUBLICATIONS

G. Buchesbaum, "A Spatial Processor Model for Object Color Perception," J. FranklinInst., 310, 1980.

* cited by examiner

F I G. 4
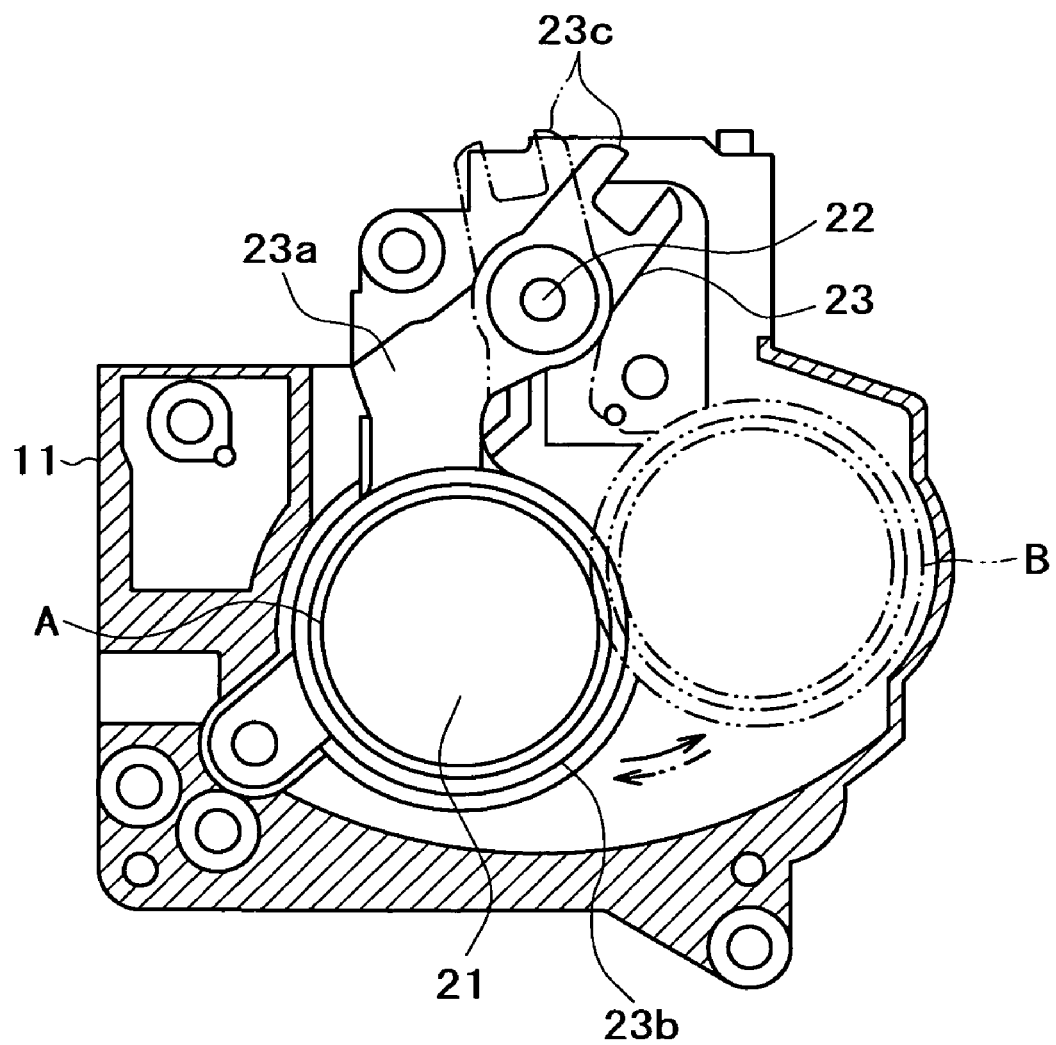

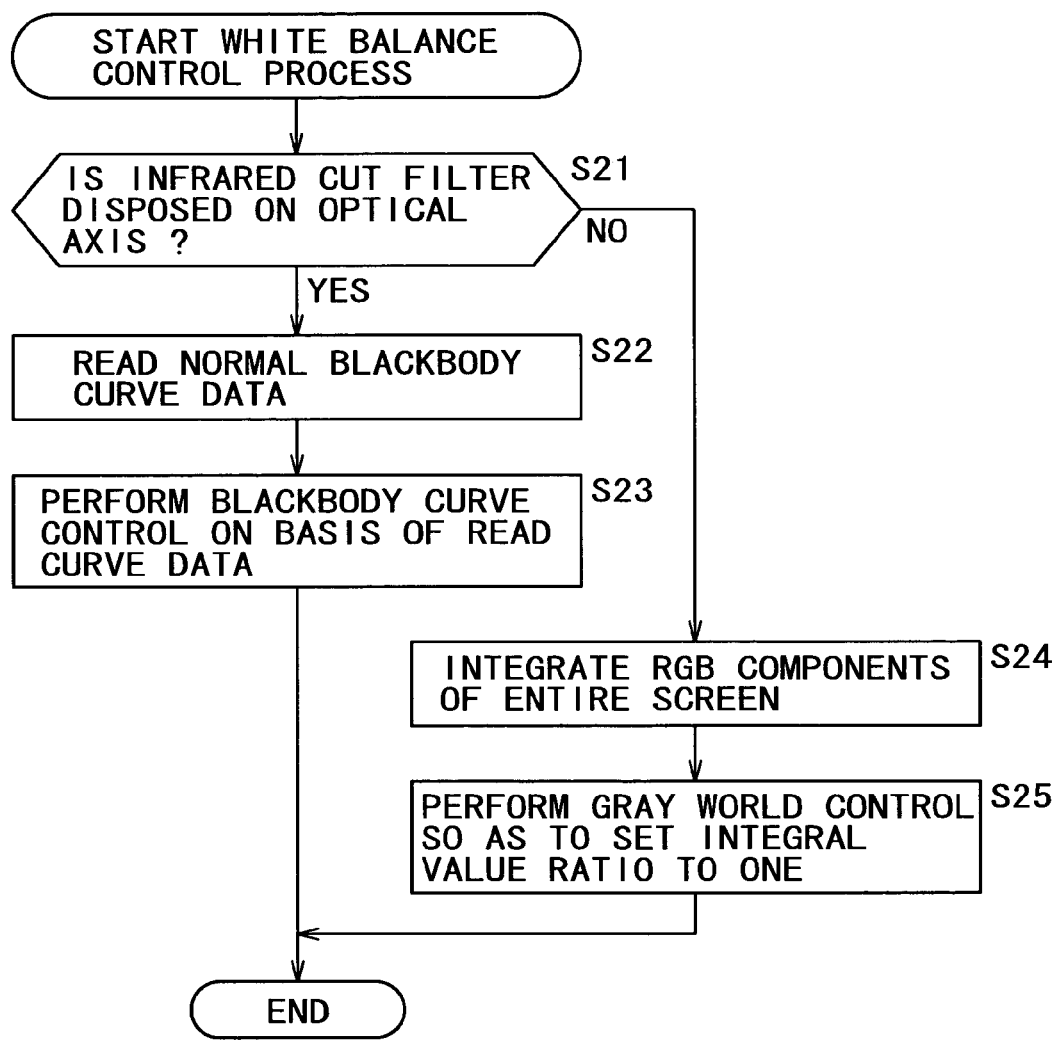
F I G. 1 1

F I G. 1 2
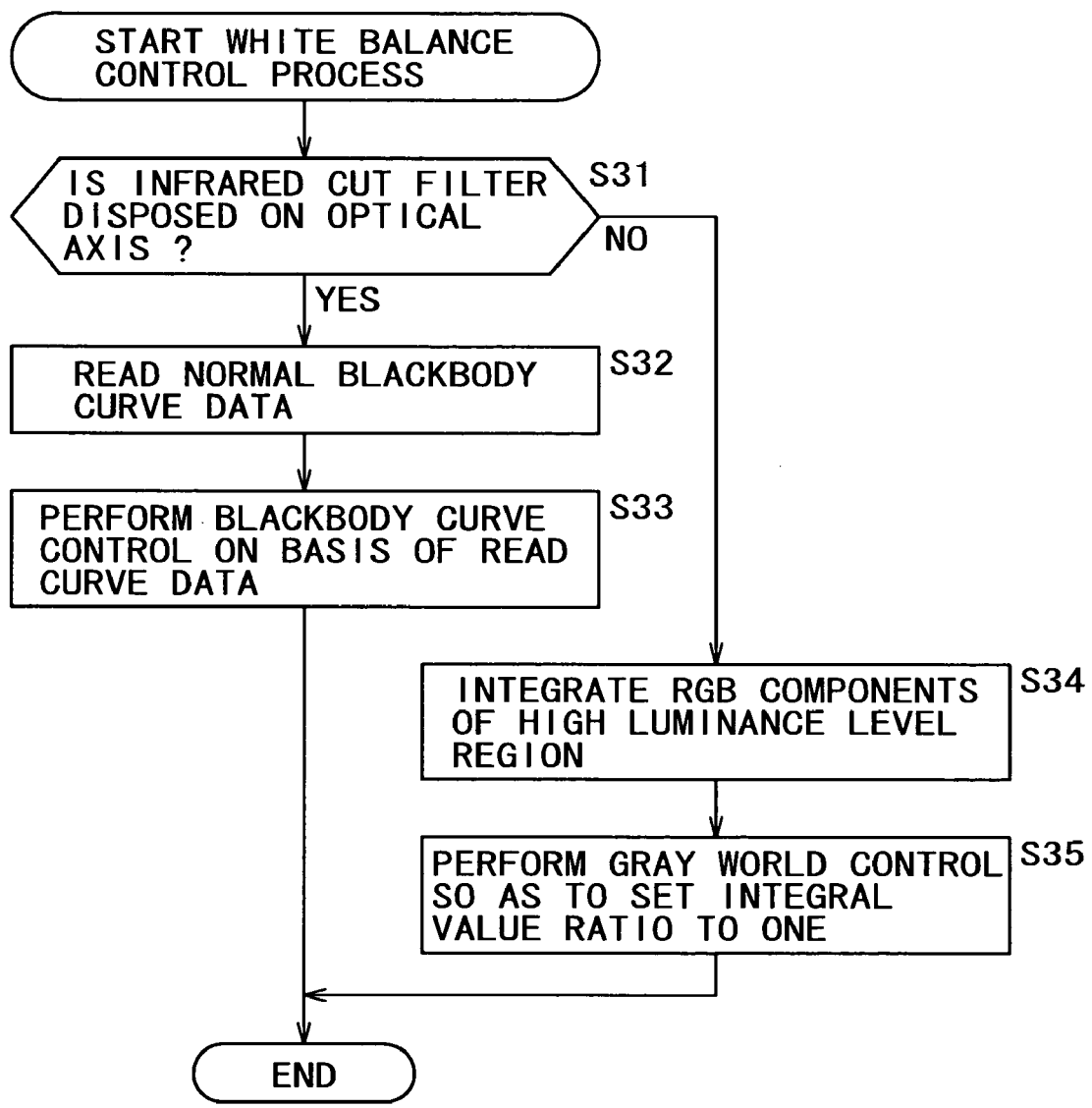

IMAGE PICKUP DEVICE AND METHOD

BACKGROUND OF THE INVENTION

The present invention relates to a device and a method for image pickup, and particularly to a device and a method for image pickup that can perform white balance control according to whether an infrared cut filter is present or not.

Of conventional digital video cameras, a digital video camera is proposed which selectively switches an infrared cut filter to a position on an optical axis of a lens group and a position off the optical axis so that the digital video camera can be used for both picture taking using near-infrared light and picture taking using visible light (see for example Patent Document 1).

Adjustment of a color balance of a camera is referred to as white balance adjustment. A method is proposed which controls an RGB integral ratio to 1:1:1 on the basis of a hypothesis that a spatial average of reflectance of a surface of an object in a scene is close to gray (hereinafter referred to as gray world control). This gray world control is detailed in a document of G. Buchesbaum, "A Spatial Processor Model for Object Color Perception," J. FranklinInst., 310, 1980.

Further, since many light sources can be regarded as a blackbody, a method is proposed which performs control such that a ratio between respective integral values of an R component, a G component, and a B component of an entire screen is the same as an RGB ratio of blackbody curve data L as shown in FIG. 1 (hereinafter referred to as blackbody curve control). In FIG. 1, an axis of ordinates indicates ratio (B/G) between the integral values of the B component and the G component, and an axis of abscissas indicates ratio (R/G) between the integral values of the R component and the G component. The blackbody curve data L indicates ratios between primary color signals R, G, and B based on a white subject taken under a light source at various color temperatures, and represents a curve such that as one of the ratios is increased, the other ratio is decreased. Also, the color temperature rises as the B/G ratio is increased, and the color temperature falls as the R/G ratio is increased. In the example of FIG. 1, integral value ratios when the color temperature is 7500 K, 5800 K, and 3200 K, respectively, are plotted. Details of the blackbody curve control are disclosed in Japanese Patent Publication No. 2751297.

The gray world control assumes that there is no color deviation within a screen. When there is a color deviation, a white balance is disturbed greatly. On the other hand, the blackbody curve control has an advantage of not readily causing a shift in the white balance even when there is a color deviation. Thus the blackbody curve control is now a mainstream white balance system.

However, at a time of so-called night-shot picture taking, or picture taking in a dark place by irradiation with infrared rays, not only visible light but also an infrared component enters a digital video camera. Hence, blackbody curve control performed using the blackbody curve data L (FIG. 1) for visible light which data is included in a microcomputer changes a color balance of the digital video camera due to effects of the infrared rays. Thus rays of light including the infrared rays redden an entire screen.

Accordingly, in a present situation, the entire screen is purposely made to be a monotone screen for output at a time of night-shot picture taking. FIG. 2 is a flowchart of assistance in explaining a process of selectively switching between a time of normal picture taking and a time of night-shot picture taking and performing white balance control.

In step S1, the digital video camera determines whether the infrared cut filter is disposed on the optical axis of the lens group, that is, whether a mode of picture taking under normal visible light is set according to a user instruction. When the digital video camera determines that the infrared cut filter is disposed on the optical axis of the lens group, the process proceeds to step S2, where the digital video camera performs blackbody curve control so that a ratio between respective integral values of an R component, a G component, and a B component of an entire screen becomes the same as the RGB ratio of the blackbody curve data L shown in FIG. 1.

On the other hand, when the digital video camera determines in step S1 that the infrared cut filter is not disposed on the optical axis of the lens group, that is, that a mode of night-shot picture taking under light including infrared light is set according to a user instruction, the process proceeds to step S3, where the digital video camera performs control to make the entire screen a monotone screen for output.

Thus, the digital video camera controls the white balance of the camera according to picture taking conditions at the time of normal picture taking and the time of night-shot picture taking, for example.

In addition, another method of controlling the white balance of a camera is proposed which suppresses reddening of a screen by correcting a color-difference signal R-Y at a time of low illuminance (see for example Patent Document 2)

[Patent Document 1] Japanese Patent Laid-Open No. 2000-59798

[Patent Document 2] Japanese Patent Laid-Open No. 2003-70009

As described above, at the time of night-shot picture taking, a monotone screen is outputted, and therefore natural color reproduction of the camera cannot be realized.

The technique of Patent Document 2 is effective for a vehicle-mounted camera, a front-door intercom camera or the like that assumes outdoor picture taking, but is not suitable for digital cameras that need to take pictures under various light sources such as fluorescent lamps, incandescent lamps and the like.

SUMMARY OF THE INVENTION

The present invention has been made in view of the above, and it is accordingly an object of the present invention to realize natural color reproduction of a camera at a time of picture taking under light including an infrared component.

According to the present invention, an image pickup device is provided comprising: a detecting unit configured to detect a position of a filter for changing light separation; and a white balance controlling unit configured to perform white balance control on a basis of the position of the filter detected by the detecting unit.

When the detecting unit detects that the filter is at an optical axis position, the white balance controlling unit can perform control such that a ratio between integral values of video signals obtained by picture taking becomes a ratio between integral values of video signals based on a white subject.

When the detecting unit detects that the filter is at an external position off an optical axis, the white balance controlling unit can perform control such that a ratio between integral values of video signals obtained by picture taking becomes one.

The controlling unit can perform control such that a ratio between integral values of a high-luminance portion of the video signals becomes one.

The controlling unit can perform control such that a ratio between integral values of a predetermined luminance range portion of the video signals becomes one.

When the detecting unit detects that the filter is at an external position off an optical axis, the white balance controlling unit can perform control such that a ratio between integral values of video signals obtained by picture taking becomes a ratio between integral values of video signals based on a white subject taking an infrared component into consideration.

When the detecting unit detects that the filter is at an external position off an optical axis, the white balance controlling unit can avoid performing low-illuminance achromatization.

Further, according to the present invention, an image pickup method is provided, comprising the steps of: detecting a position of a filter for changing light separation; and performing white balance control on a basis of the position of the filter detected by a process of the detecting step.

Still further, according to the present invention, there is provided an image pickup device comprising: detecting means for detecting a position of a filter for changing light separation; and white balance controlling means for performing white balance control on a basis of the position of the filter detected by the detecting means.

In the present invention, a position of a filter for changing light separation is detected, and white balance control is performed on a basis of the detected position of the filter.

According to the present invention, it is possible to perform white balance control. In particular, it is possible to change a white balance control method according to whether an infrared cut filter is present or not.

BRIEF DESCRIPTION OF THE DRAWINGS

FIG. 4 is a sectional view taken along a line A-A shown in FIG. 3;

FIG. 11 is a flowchart of assistance in explaining another white balance control process;

FIG. 12 is a flowchart of assistance in explaining another white balance control process;

DETAILED DESCRIPTION OF THE PREFERRED EMBODIMENTS

The best mode for carrying out the present invention will hereinafter be described. Correspondences between disclosed inventions and embodiments are illustrated as follows. Even when there is an embodiment described in the present specification but not described here as corresponding to an invention, it does not signify that the embodiment does not correspond to the invention. Conversely, even when an embodiment is described here as corresponding to an invention, it does not signify that the embodiment does not correspond to inventions other than that invention.

Further, this description does not represent all inventions described in the specification. In other words, this description does not negate presence of inventions described in the specification but not claimed in the present application, that is, presence of inventions for divisional application or to be presented and added by amendments in the future.

The present invention provides an image pickup device (for example a video camera in FIGS. 3 to 6) comprising: a detecting unit (for example a microcomputer 58 in FIG. 6 that performs a process of step S11 in FIG. 10, step S21 in FIG. 11, step S31 in FIG. 12, or step S41 in FIG. 13) configured to detect a position of a filter for changing light separation; and a white balance controlling unit (for example the microcomputer 58 in FIG. 6 that performs a process of steps S13 and S15 in FIG. 10, steps S23 and S25 in FIG. 11, steps S33 and S35 in FIG. 12, or steps S43 and S45 in FIG. 13) configured to perform white balance control on a basis of the position of the filter detected by the detecting unit.

Figure 9:
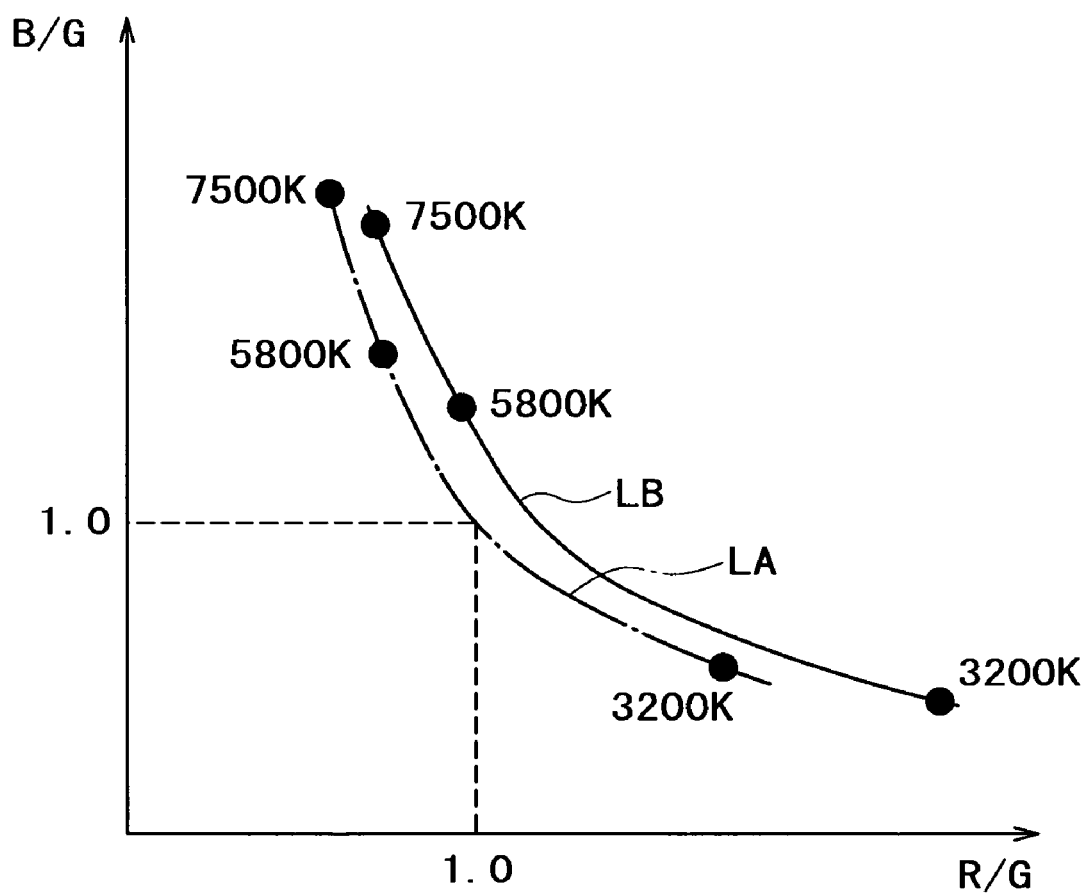
FIG. 9 is a diagram showing examples of blackbody curve data as a microcomputer table.

When the detecting unit detects that the filter is at a position of an optical axis (for example an optical axis position A in FIG. 6), the white balance controlling unit can perform control such that a ratio between integral values of video signals obtained by picture taking becomes a ratio of integral values of video signals based on a white subject (for example becomes the same as an RGB ratio of blackbody curve data LA in FIG. 9).

When the detecting unit detects that the filter is at an external position off the optical axis (for example an external position B in FIG. 6), the white balance controlling unit can perform control such that a ratio between integral values of video signals obtained by picture taking becomes one.

The controlling unit can perform control such that a ratio between integral values of a high-luminance portion of the video signals becomes one.

The controlling unit can perform control such that a ratio between integral values of a predetermined luminance range portion of the video signals becomes one.

When the detecting unit detects that the filter is at an external position off the optical axis (for example an external position B in FIG. 6), the white balance controlling unit can perform control such that a ratio between integral values of video signals obtained by picture taking becomes a ratio between integral values of video signals based on a white subject taking an infrared component into consideration (for example becomes the same as an RGB ratio of blackbody curve data LB obtained by taking an infrared component into consideration in FIG. 9).

When the detecting unit detects that the filter is at an external position off the optical axis (for example an external position B in FIG. 6), the white balance controlling unit can avoid performing low-illuminance achromatization.

Figure 10:
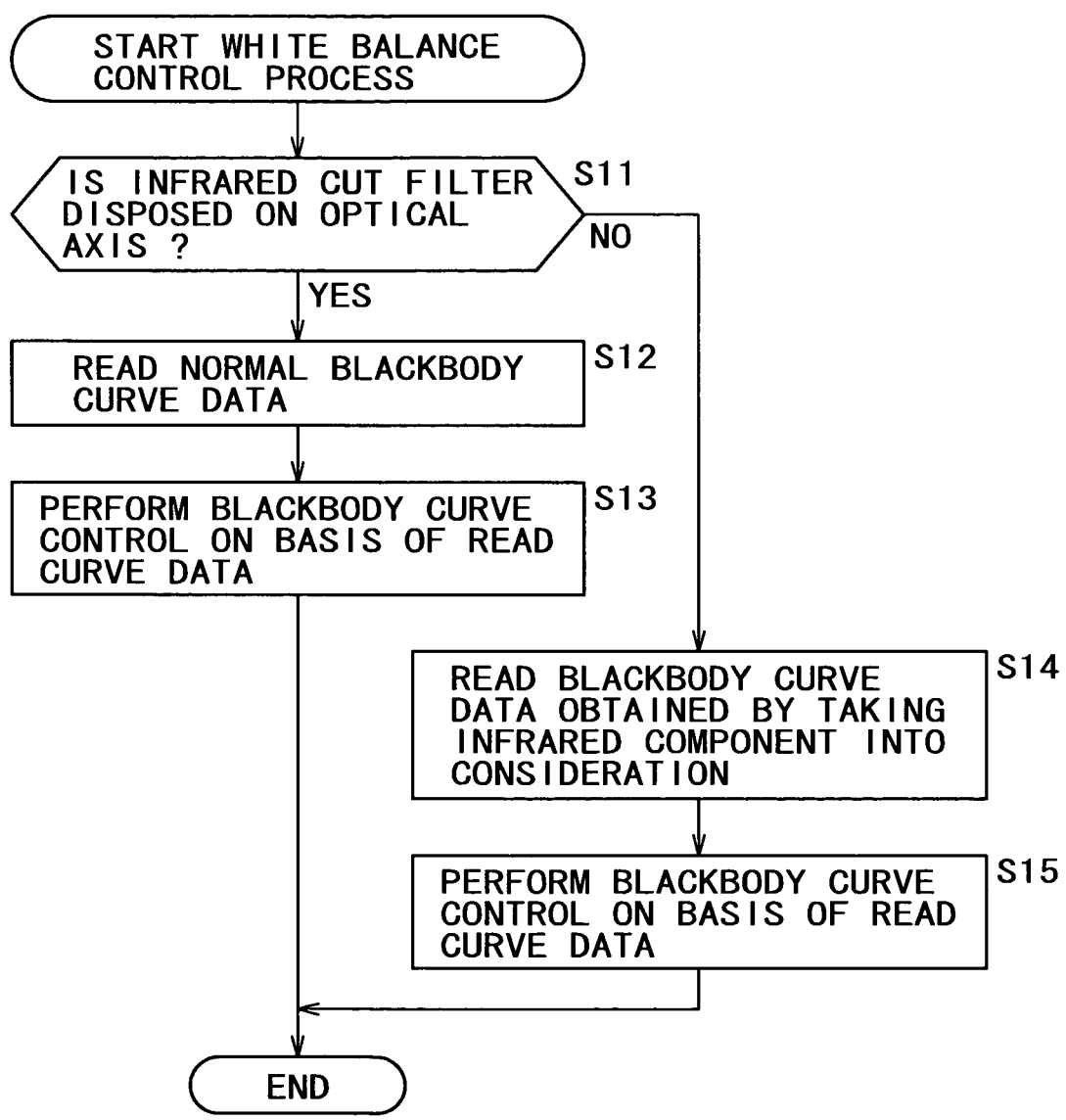
FIG. 10 is a flowchart of assistance in explaining a white balance control process.
Figure 13:
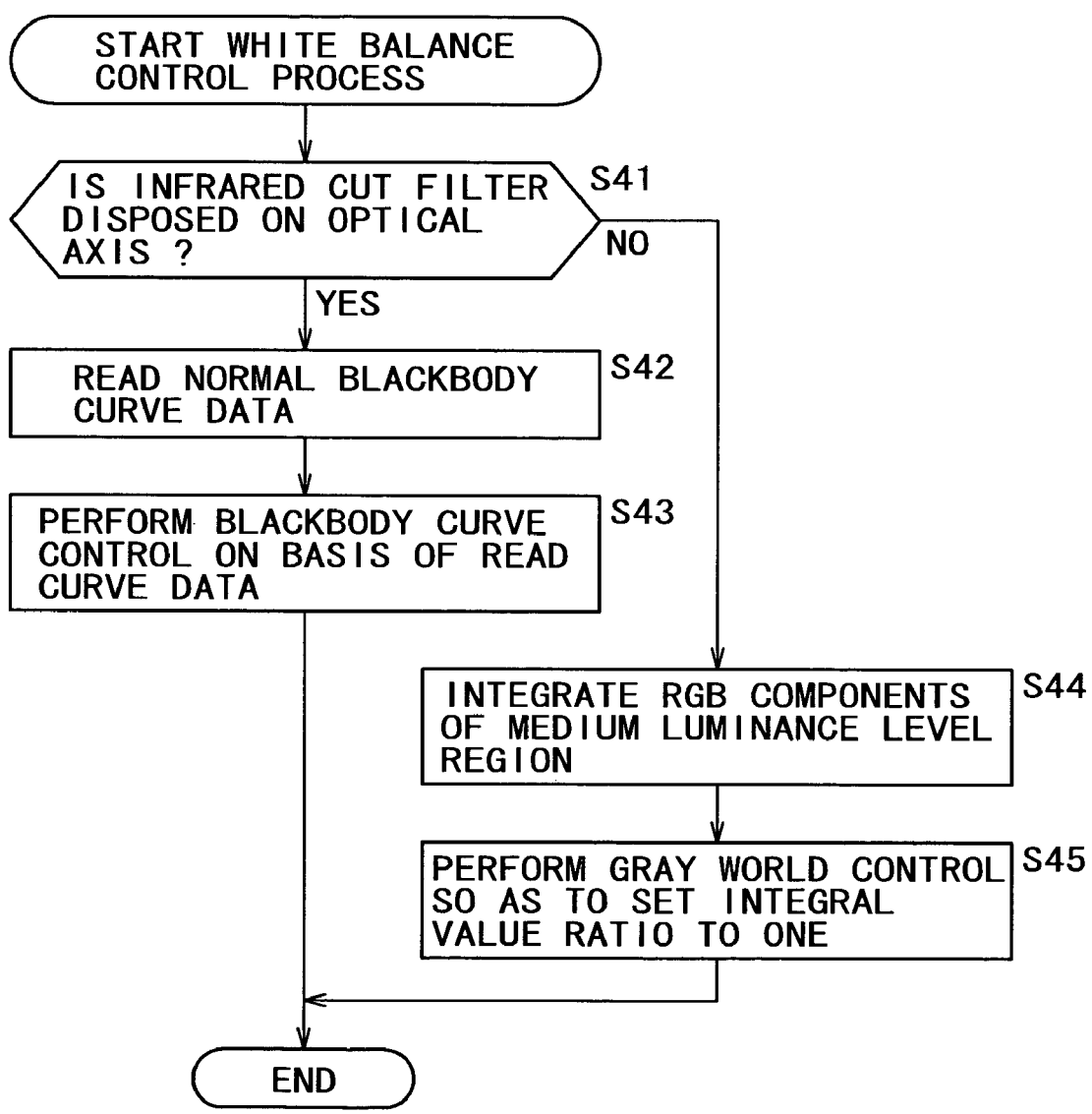
FIG. 13 is a flowchart of assistance in explaining another white balance control process.

Further, the present invention provides an image pickup method, comprising the steps of: detecting a position of a filter for changing light separation (for example step S11 in FIG. 10, step S21 in FIG. 11, step S31 in FIG. 12, or step S41 in FIG. 13); and performing white balance control on a basis of the position of the filter detected by a process of the detecting step (for example steps S13 and S15 in FIG. 10, steps S23 and S25 in FIG. 11, steps S33 and S35 in FIG. 12, or steps S43 and S45 in FIG. 13).

An embodiment of the present invention will hereinafter be described with reference to the drawings.

Figure 1:
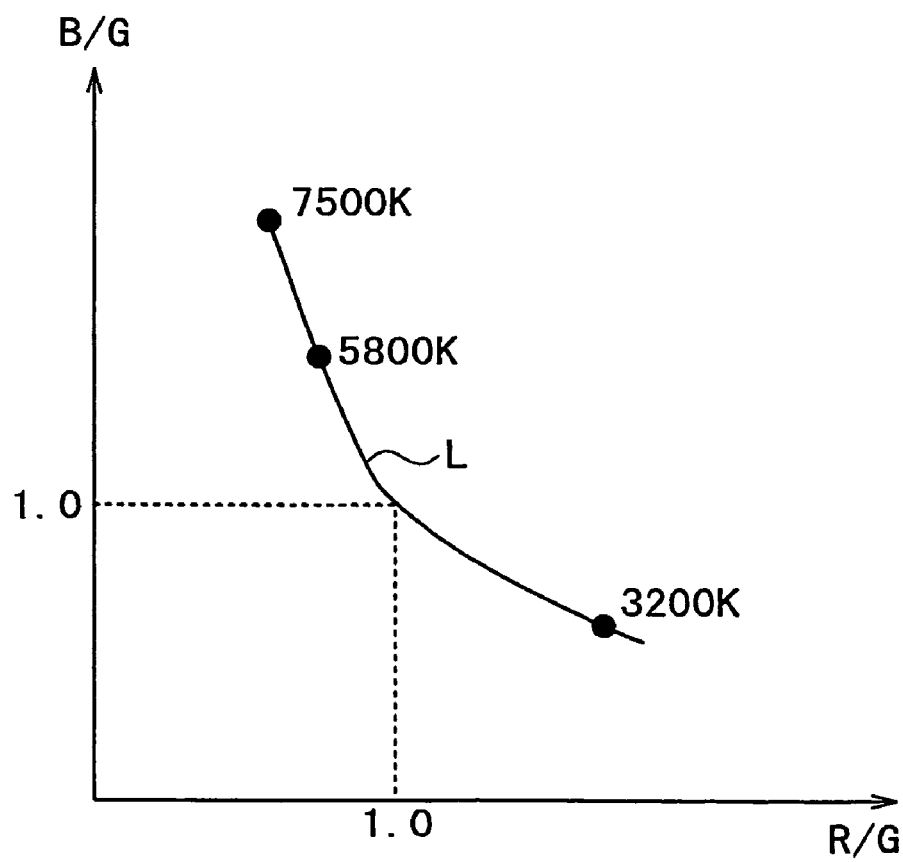
FIG. 1 is a diagram showing an example of blackbody curve data.
Figure 2:
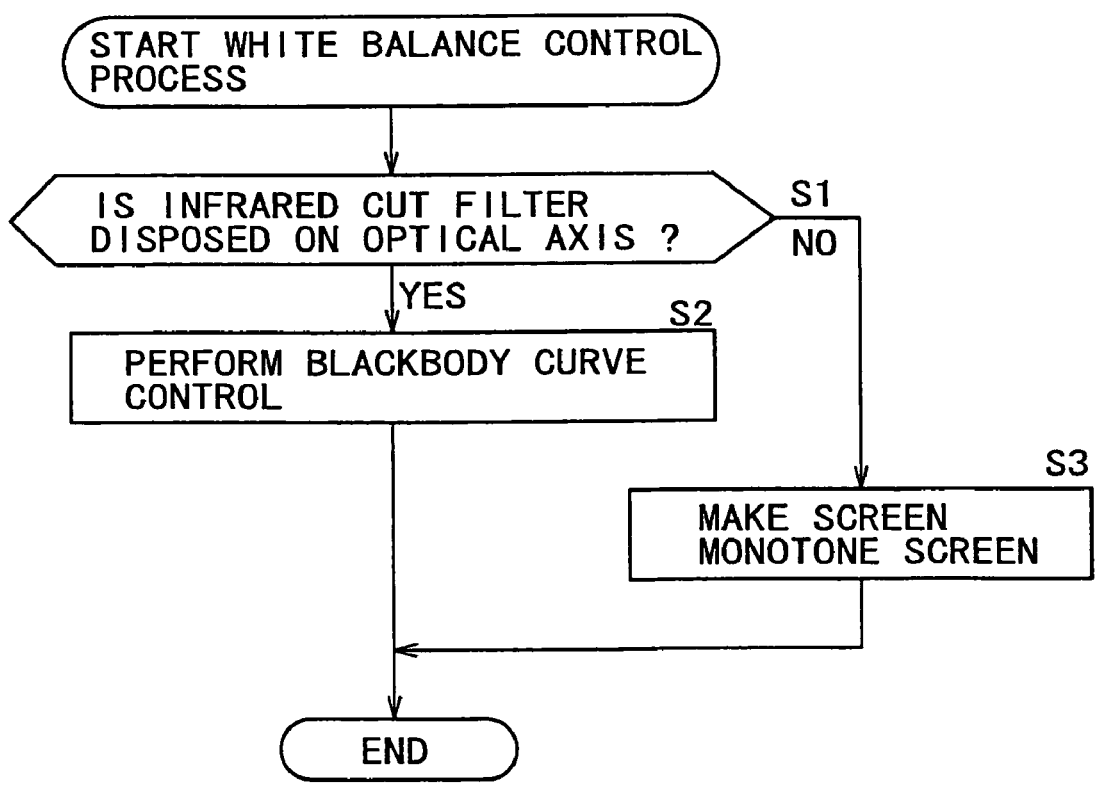
FIG. 2 is a flowchart of assistance in explaining a conventional white balance control process.
Figure 3:
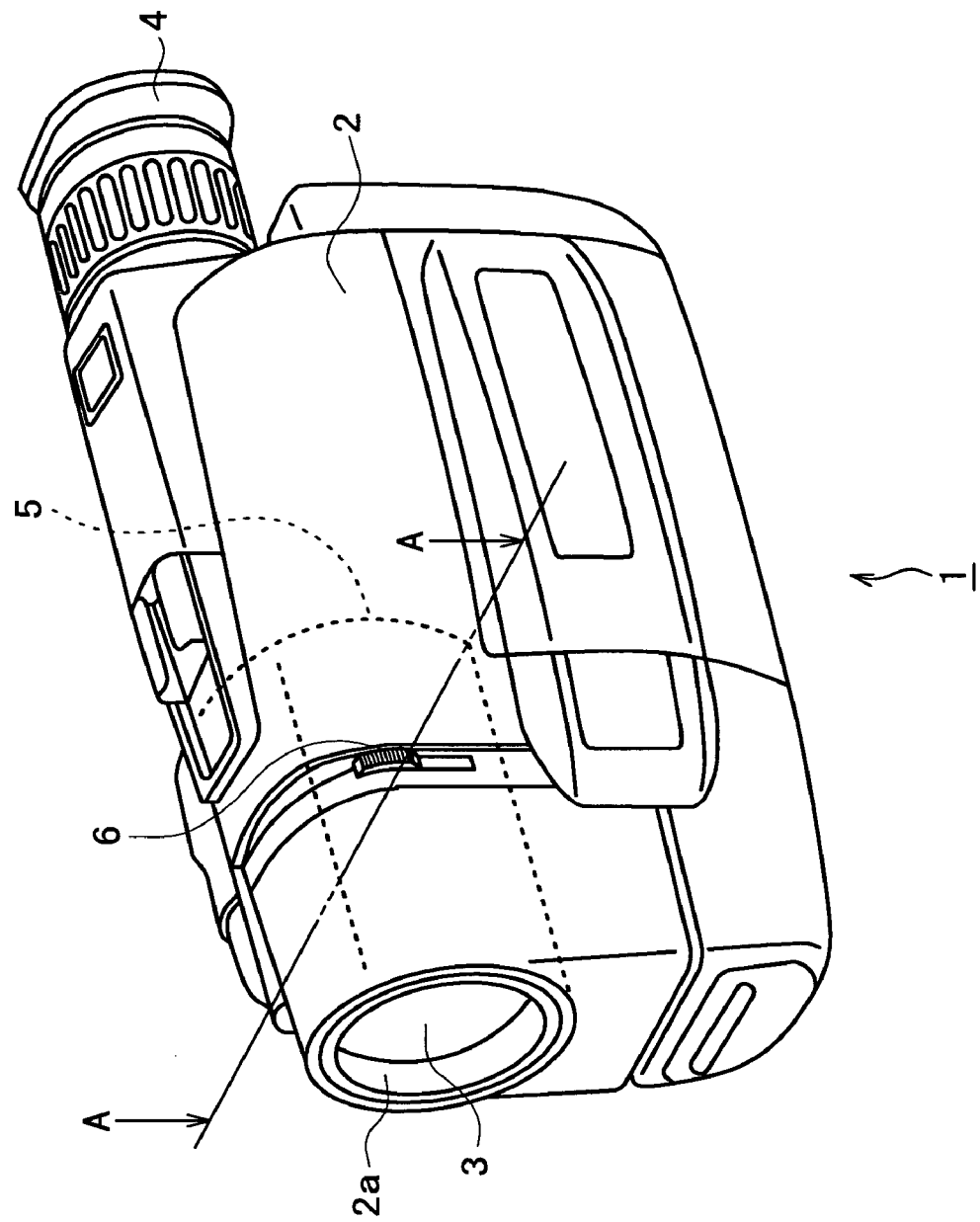
FIG. 3 is a diagram showing an example of configuration of a video camera to which the present invention is applied.
Figure 5:
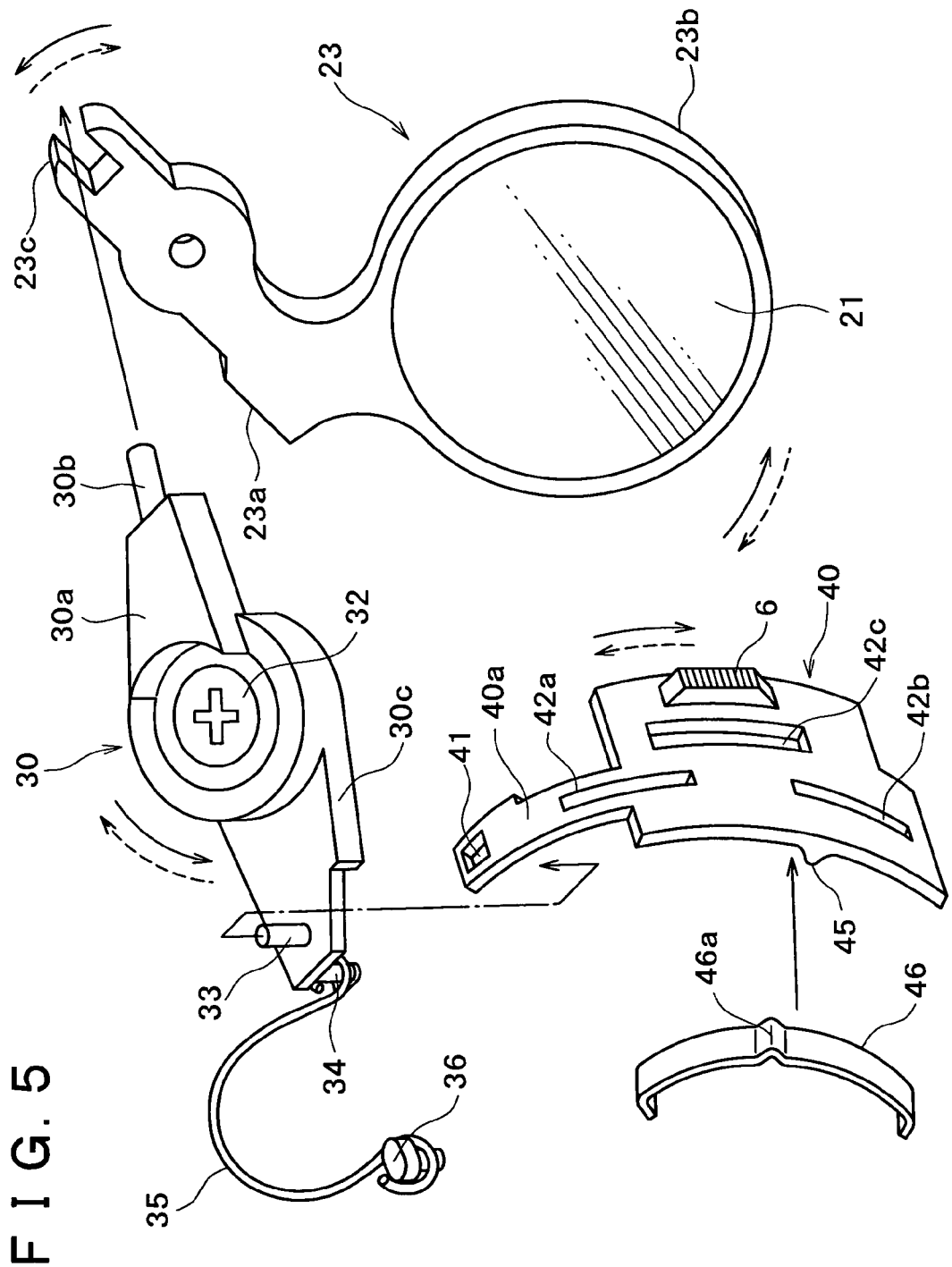
FIG. 5 is an exploded perspective view of a link device in FIG. 3.

FIGS. 3 to 5 are diagrams showing an example of the structure of a video camera 1 to which the present invention is applied. FIG. 3 is a perspective external view of the video camera 1. FIG. 4 is a sectional view taken along a line A-A shown in FIG. 3 (a sectional view of a lens block of the video camera 1). FIG. 5 is an exploded perspective view of a link device.

As shown in FIG. 3, the video camera 1 comprises: a camera mechanism unit configured to capture an image of a subject as light and convert the optical image into an electric signal; a video mechanism unit configured to record the electric signal from the camera mechanism unit and reproduce the recorded electric signal; and a camera exterior body 2, as a cabinet, configured to house the camera mechanism unit and the video mechanism unit.

The camera mechanism unit comprises for example: a lens group 51 (FIG. 6) including an objective lens 3 opposed to a subject, configured to transmit an optical image of the subject which image is made incident as light from the objective lens 3, and form the image on a light receiving unit; an image pickup element 54 (FIG. 6) configured to convert the optical image transmitted by the lens group 51 and formed on the light receiving unit into an electric signal; a viewfinder 4 configured to view the image captured by the objective lens 3 with an eye; and a control unit (not shown) configured to control the driving of a motor for focusing the lens group 51, adjusting an amount of iris opening and the like.

A lens hole 2a is provided in an upper part of a front of the camera exterior body 2. A lens block 5 comprising the lens group 51 including an autofocus mechanism, a zoom mechanism and the like, and a block casing 11 for fixedly or movably holding the lens group 51 is disposed inside the lens hole 2a. The objective lens 3 placed at the front of the lens block 5 is exposed in the lens hole 2a. An infrared cut filter 21 (FIG. 4) is disposed between the lens group 51 and the image pickup element 54.

As shown in FIG. 4, a filter holding link 23 is rotatably supported on a rotating shaft 22 disposed in the block casing 11 of the lens block 5. The filter holding link 23 has an arm portion 23a with a bearing hole at an intermediate part thereof in which bearing hole the rotating shaft 22 is rotatably fitted, and a filter holding portion 23b in a form of a ring formed continuously at one end of the arm portion 23a. The infrared cut filter 21 is fixed to the filter holding portion 23b.

The infrared cut filter 21 fixed to the filter holding link 23 is formed such that a center of the infrared cut filter 21 in a free state of being held by fitting and hung on the rotating shaft 22 is positioned on an optical axis of the lens group 51. An input portion 23c formed into a forked shape is disposed at an opposite end of the arm portion 23a of the filter holding link 23 from the filter holding portion 23b. A rotation moment is applied to the input portion 23c to rotate the filter holding link 23 on the rotating shaft 22, whereby the infrared cut filter 21 can be selectively positioned at an optical axis position A on the optical axis of the lens group 51 and an external position B off the optical axis.

As shown in FIG. 5, an engaging pin 30b provided at a rear end of a rear arm 30a of a rotating link 30 is inserted in the forked portion of the input portion 23c. The rotating link 30 is rotatably supported on the block casing 11 at a middle portion thereof by a mounting screw 32. A front arm 30c extending to the front from a center of rotation of the rotating link 30 is provided with a connecting pin 33 projecting in an upward direction and a spring engaging pin 34 projecting in a downward direction. The spring engaging pin 34 engages with an end of an Ω-shaped spring 35. Another end of the Ω-shaped spring 35 engages with a spring engaging pin 36 provided to the block casing 11. A force of the Ω-shaped spring 35 biases the rotating link 30 so that the rotating link 30 is at one of the optical axis position A and the external position B off the optical axis.

An engaging hole 41 of a slide link 40 is fitted in the connecting pin 33 of the rotating link 30. The slide link 40 is formed of a plate member formed in a curved manner so as to make slide movement on the outside of the lens block 5 in an arc manner along an outer circumference of the lens block 5. The slide link 40 has a connecting arm 40a on one side thereof in a direction of the curve. A square engaging hole 41 is made open in a tip portion of the connecting arm 40a. Guide grooves 42a, 42b, and 42c extending in the direction of the curve are disposed at three positions of the slide link 40 including the connecting arm 40a.

The three guide grooves 42a, 42b, and 42c are provided to move the slide link 40 in a circumferential direction smoothly. Three guide projections (not shown) are provided on the camera exterior body 2 to correspond to the guide grooves 42a, 42b, and 42c, respectively. The slide link 40 is held to the camera exterior body 2 so as to be able to make slide movement in the circumferential direction in a state in which the guide projections of the camera exterior body 2 are engaged with the guide grooves 42a, 42b, and 42c, respectively.

An operating handle 6 projecting on an outer surface side is provided on an outside of the guide groove 42c of the slide link 40. The operating handle 6 is disposed so as to extend in the same direction as the guide groove 42c. The operating handle 6 is passed through an opening of the camera exterior body 2 so that a knurled portion (not shown) provided in a top surface of the operating handle 6 projects to the outside of the camera exterior body 2.

A projecting part 45, (in the form of a mountain) for clicking, is provided on an inner surface opposite from the operating handle 6 of the slide link 40. A plate spring 46 for providing a sense of clicking at a time of operation of the slide link 40 is attached to the camera exterior body 2 to correspond to the projecting part 45. The plate spring 46 is formed of a plate body in a shape of a strip having such a length as to be hidden inside the slide link 40. The plate spring 46 has a convex portion 46a projecting, in a shape of a mountain, to the slide link 40 side at a middle portion in a direction of length of the plate spring 46. When the projecting part 45 of the slide link 40 goes over the convex portion 46a of the plate spring 46, a biasing force of the plate spring 46 provides a sense of clicking to the operating handle 6.

In the video camera 1 having the above structure, the infrared cut filter 21 included in the lens block 5 selectively changes its position to allow taking of a picture of a subject according to an amount of ambient light. Specifically, the infrared cut filter 21 is disposed at the optical axis position A at a time of normal picture taking and disposed at the external position B at a time of night-shot picture taking.

Figure 6:
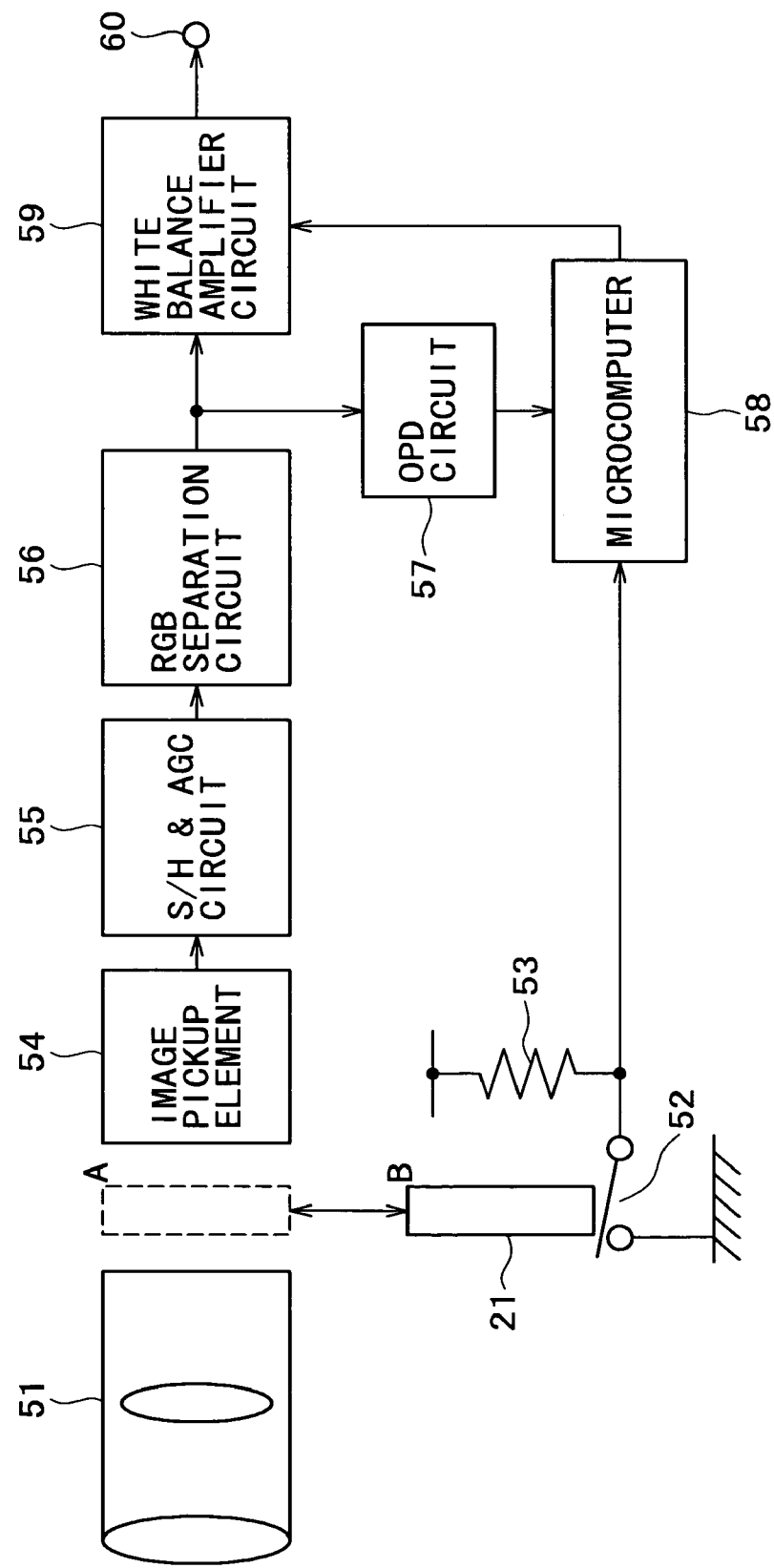
FIG. 6 is a diagram showing an example of internal configuration of the video camera.

FIG. 6 is a block diagram showing an example of internal configuration of the video camera 1.

The lens group 51 condenses light from a subject to form an image on the image pickup element 54. The image pickup element 54 is formed by two-dimensionally arranging a photoelectric conversion element for performing photoelectric conversion, such as, for example, a CCD (Charge Coupled Device). Color separating filters (not shown) arranged in a mosaic manner are mounted on a front surface of the photoelectric conversion element. Thus, the image pickup element 54 subjects the optical image of the subject which image enters the image pickup element 54 via the lens group 51 and the color separating filters, thereby generates an image pickup signal (charge), and then outputs the generated image pickup signal to an S/H (sample-and-hold) & AGC (Automatic Gain Control) circuit 55.

Figure 7:
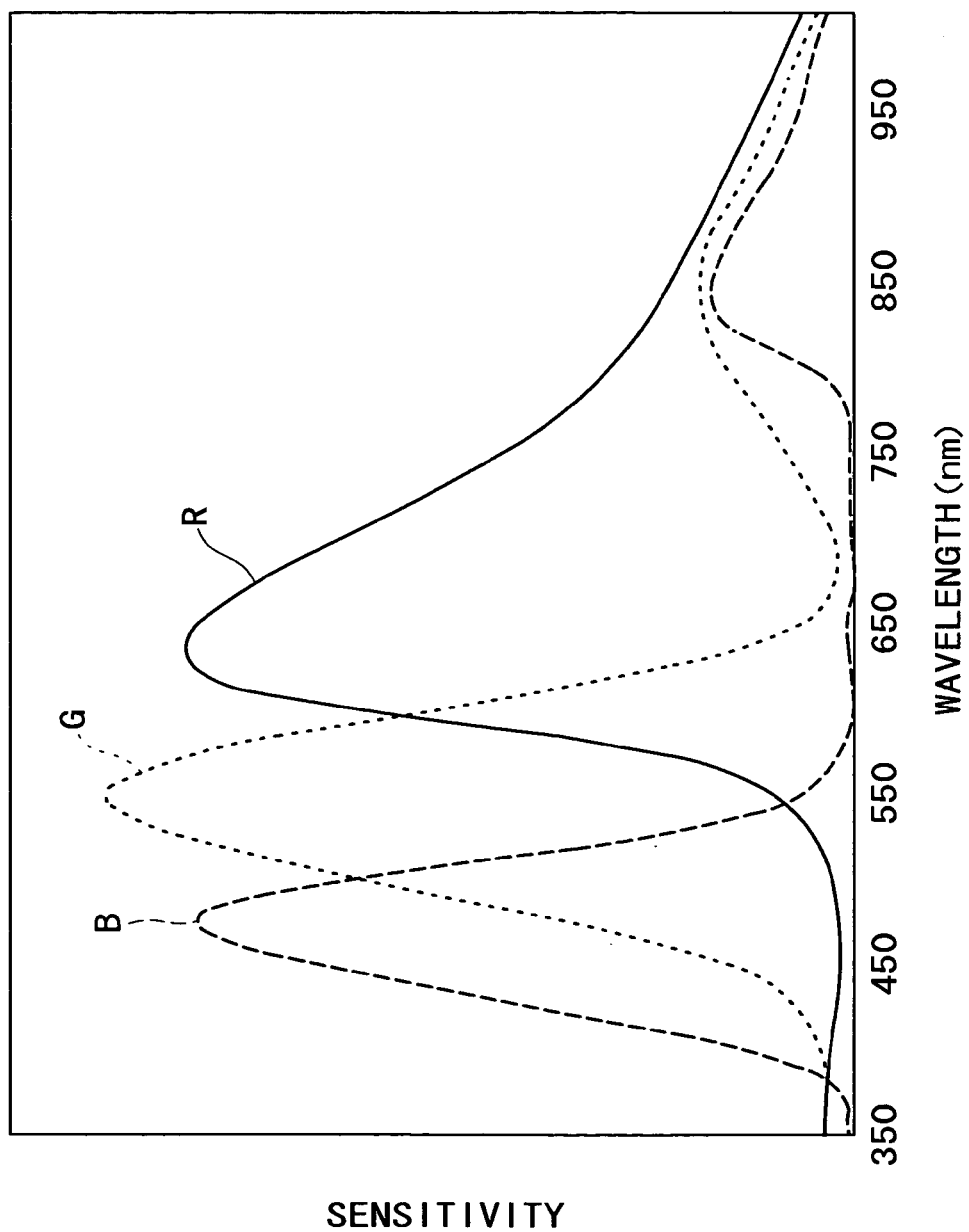
FIG. 7 is a diagram showing an example of spectral characteristics of RGB primary color filters.
Figure 8:
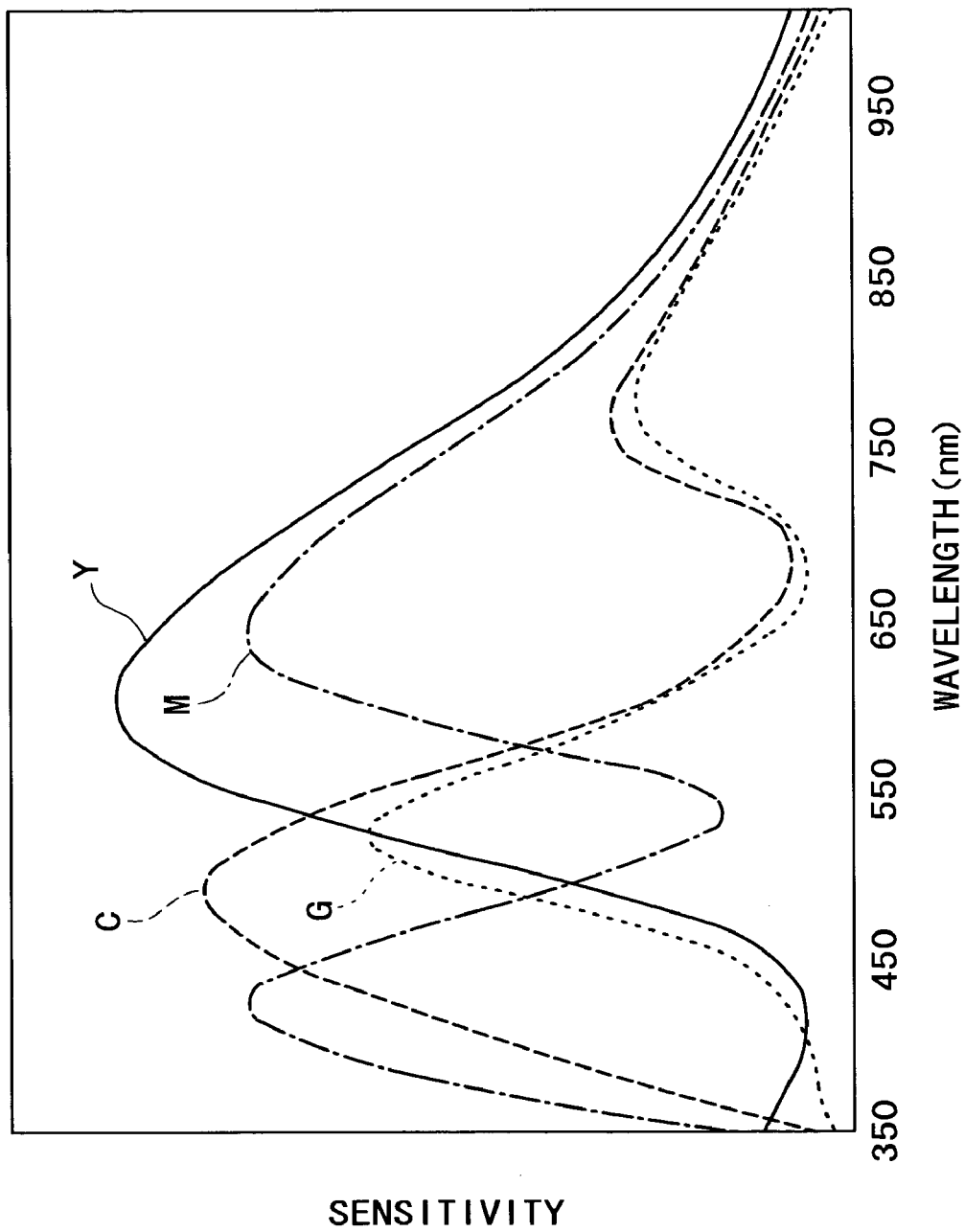
FIG. 8 is a diagram showing an example of spectral characteristics of CMY complementary color filters.

Examples of spectral characteristics of the color separating filters used in the image pickup element 54 will be described in the following with reference to FIG. 7 and FIG. 8. FIG. 7 shows an example of spectral characteristics of RGB (red, green, and blue) primary color filters. FIG. 8 shows an example of spectral characteristics of CMY (cyan, magenta, and yellow) complementary color filters. In FIG. 7 and FIG. 8, an axis of ordinates indicates sensitivity, and an axis of abscissas indicates wavelength (nm).

As shown in FIG. 7, a B filter of the RGB primary color filters transmits a component of wavelengths from about 350 nm to about 550 nm, and transmits a component of wavelengths in the vicinity of 450 nm most. A G filter transmits a component of wavelengths from about 450 nm to about 650 nm, and transmits a component of wavelengths in the vicinity of 550 nm most. An R filter transmits a component of wavelengths from about 550 nm to about 1000 nm, and transmits a component of wavelengths in the vicinity of 650 nm most.

As shown in FIG. 8, a C filter of the CMY complementary color filters transmits a component of wavelengths from about 350 nm to about 650 nm, and transmits a component of wavelengths in the vicinity of 500 nm most, and also transmits a component of wavelengths from about 700 nm to about 1000 nm, and transmits a component of wavelengths in the vicinity of 750 nm most. An M filter transmits a component of wavelengths from about 350 nm to about 550 nm, and transmits a component of wavelengths in the vicinity of 400 nm most, and also transmits a component of wavelengths from about 550 nm to about 1000 nm, and transmits a component of wavelengths in the vicinity of 650 nm most. A Y filter transmits a component of wavelengths from about 450 nm to about 1000 nm, and transmits a component of wavelengths in the vicinity of 600 nm most. A G filter transmits a component of wavelengths from about 450 nm to about 650 nm, and transmits a component of wavelengths in the vicinity of 500 nm most, and also transmits a component of wavelengths from about 700 nm to about 1000 nm, and transmits a component of wavelengths in the vicinity of 750 nm most.

As is clear from these figures, the R filter of the RGB primary color filters (FIG. 7) transmits most of an infrared component in a range of 700 nm and more. On the other hand, the Y filter and the M filter of the CMY complementary color filters (FIG. 8) transmit the infrared component, and also the C filter starts transmitting the infrared component gradually at 700 nm. Hence, the CMY complementary color filters are used as the color separating filters of the image pickup element 54 to obtain a more natural color balance than the RGB primary color filters.

Returning to the description of FIG. 6, the infrared cut filter 21 is positioned at one of the optical axis position A and the external position B off the optical axis in response to an operation of the operating handle 6 (FIG. 3). A switch 52 is connected to the infrared cut filter 21, and the switch 52 is turned on in a state in which the infrared cut filter 21 is at the external position B. The switch 52 is connected in parallel with a resistance 53 to which a predetermined voltage is applied.

The image pickup element 54 generally has sensitivity to not only visible light (400 to 700 nm) but also infrared light (700 to 1000 nm). Thus, at a time of normal picture taking, the infrared cut filter 21 is disposed at the optical axis position A, whereby an optical image of only a visible light component excluding an infrared light component is formed on the image pickup element 54. At a time of night-shot picture taking, on the other hand, the infrared cut filter 21 is disposed at the external position B, whereby an optical image including a visible light component and an infrared light component is formed on the image pickup element 54.

The S/H & AGC circuit 55 samples and holds the image pickup signal inputted thereto, performs automatic gain control, and then outputs the result as a video signal to an RGB separation circuit 56. The RGB separation circuit 56 separates the video signal inputted thereto into an R component, a G component, and a B component. The RGB separation circuit 56 outputs the R component, the G component, and the B component to an OPD (OPtical Detector) circuit 57, and also outputs the R component, the G component, and the B component to a white balance amplifier circuit 59.

The OPD circuit 57 is a so-called detector circuit. The OPD circuit 57 detects color information within a screen from video signals (hereinafter referred to as video signals R, G, and B) of the R component, the G component, and the B component inputted from the RGB separation circuit 56, and then supplies a result of the detection to a microcomputer 58.

The microcomputer 58 detects whether the infrared cut filter 21 is disposed at the optical axis position A or at the external position B by detecting the on/off state of the switch 52 on the basis of a current inputted via the resistance 53.

When the infrared cut filter 21 is disposed at the optical axis position A, the microcomputer 58 calculates respective integral values of the video signals R, G, and B on the basis of the result of the detection (the color information within the screen) supplied from the OPD circuit 57. Further, on the basis of a result of the calculation, the microcomputer 58 calculates a ratio (R/G) of the integral value of the video signal R to the integral value of the video signal G, and calculates a ratio (B/G) of the integral value of the video signal B to the integral value of the video signal G. The microcomputer 58 retains in advance blackbody curve data LA (FIG. 9) obtained by taking only visible light into consideration as a microcomputer table. The microcomputer 58 then calculates respective optimum gains for the video signals R, G, and B so that the calculated integral value ratios (R/G and B/G) become the same as an RGB ratio of the blackbody curve data LA. The microcomputer 58 supplies a result of the calculation as a control signal to the white balance amplifier circuit 59.

When the infrared cut filter 21 is disposed at the external position B, the microcomputer 58 calculates respective integral values of the video signals R, G, and B on the basis of the result of the detection (the color information within the screen) supplied from the OPD circuit 57. Further, the microcomputer 58 calculates integral value ratios (R/G and B/G). The microcomputer 58 then calculates respective optimum gains for the video signals R, G, and B so that the calculated integral value ratios (R/G and B/G) become one. The microcomputer 58 supplies a result of the calculation as a control signal to the white balance amplifier circuit 59. Alternatively, the microcomputer 58 retains in advance blackbody curve data LB (FIG. 9) obtained by taking visible light and an infrared light component into consideration as a microcomputer table. The microcomputer 58 then calculates respective optimum gains for the video signals R, G, and B so that the calculated integral value ratios (R/G and B/G) become the same as an RGB ratio of the blackbody curve data LB obtained by taking the infrared component into consideration. The microcomputer 58 supplies a result of the calculation as a control signal to the white balance amplifier circuit 59.

FIG. 9 shows examples of the blackbody curve data LA and the blackbody curve data LB obtained by taking the infrared component into consideration as the microcomputer table retained by the microcomputer 58. In FIG. 9, an axis of ordinates indicates the ratio (B/G) between the integral values of the B component and the G component, and an axis of abscissas indicates the ratio (R/G) between the integral values of the R component and the G component. The blackbody curve data LA of a visible light component indicates ratios between primary color signals R, G, and B based on a white subject taken under a light source at various color temperatures, and represents a curve such that as one of the ratios is increased, the other ratio is decreased. The blackbody curve data LB obtained by taking the infrared component into consideration indicates ratios between primary color signals R, G, and B based on a white subject taken under a light source at various color temperatures, with the infrared component additionally taken into consideration, and represents a curve such that as one of the ratios is increased, the other ratio is decreased. Also, the blackbody curve data LA and LB indicates that the color temperature rises as the B/G ratio is increased, and that the color temperature falls as the R/G ratio is increased. In the example of FIG. 9, integral value ratios when the color temperature is 7500 K, 5800 K, and 3200 K, respectively, are plotted.

Returning to the description of FIG. 6, the white balance amplifier circuit 59 performs white balance control by controlling respective gains for the video signals R, G, and B on the basis of the control signal supplied from the microcomputer 58. Specifically, at a time of normal picture taking, the white balance amplifier circuit 59 performs blackbody curve control so that the ratio between the integral values of the three primary color signals R, G, and B becomes the same as the RGB ratio of the blackbody curve data LA (FIG. 9). At a time of night-shot picture taking, the white balance amplifier circuit 59 performs blackbody curve control so that the ratio between the integral values of the three primary color signals R, G, and B becomes the same as the RGB ratio of the blackbody curve data LB (FIG. 9) obtained by taking the infrared component into consideration, or performs gray world control so that the ratio between the integral values of the three primary color signals R, G, and B becomes one.

A terminal 60 outputs a video signal whose white balance is controlled (that is, whose color balance is adjusted) by the white balance amplifier circuit 59.

A white balance control process will next be described with reference to a flowchart of FIG. 10. Before starting this process, the microcomputer 58 retains in advance the blackbody curve data LA and LB (FIG. 9) as microcomputer tables corresponding to picture taking conditions.

In step S11, the microcomputer 58 determines whether the infrared cut filter 21 is disposed at the optical axis position A, that is, whether the switch 52 is off on the basis of the current inputted via the resistance 53. When the microcomputer 58 determines that the infrared cut filter 21 is disposed at the optical axis position A, the process proceeds to step S12 to read the normal blackbody curve data LA (FIG. 9). The microcomputer 58 calculates respective integral values of video signals R, G, and B on the basis of a detection result (color information within a screen) supplied from the OPD circuit 57. Further, on the basis of a result of the calculation, the microcomputer 58 calculates a ratio (R/G) of the integral value of the video signal R to the integral value of the video signal G, and calculates a ratio (B/G) of the integral value of the video signal B to the integral value of the video signal G. The microcomputer 58 then calculates respective optimum gains for the video signals R, G, and B so that the calculated integral value ratios (R/G and B/G) become the same as the RGB ratio of the blackbody curve data LA (FIG. 9). The microcomputer 58 supplies a result of the calculation as a control signal to the white balance amplifier circuit 59.

In step S13, under control of the microcomputer 58, the white balance amplifier circuit 59 performs blackbody curve control on the video signals R, G, and B so as to attain the optimum gains calculated on the basis of the blackbody curve data LA read by the process of step S12.

When the microcomputer 58 determines in step S11 that the infrared cut filter 21 is not disposed at the optical axis position A, that is, that the infrared cut filter 21 is disposed at the external position B, the process proceeds to step S14, where the microcomputer 58 reads the blackbody curve data LB (FIG. 9) obtained by taking the infrared component into consideration. Then, the microcomputer 58 calculates respective integral values of video signals R, G, and B on the basis of a detection result (color information within a screen) supplied from the OPD circuit 57. Further, the microcomputer 58 calculates integral value ratios (R/G and B/G). The microcomputer 58 then calculates respective optimum gains for the video signals R, G, and B so that the calculated integral value ratios (R/G and B/G) become the same as the RGB ratio of the blackbody curve data LB (FIG. 9). The microcomputer 58 supplies a result of the calculation as a control signal to the white balance amplifier circuit 59.

In step S15, under control of the microcomputer 58, the white balance amplifier circuit 59 performs blackbody curve control on the video signals R, G, and B so as to attain the optimum gains calculated on the basis of the blackbody curve data LB read by the process of step S14.

Thus, when the infrared cut filter 21 is disposed at the optical axis position A (at a time of normal picture taking), the blackbody curve data LA is read and the blackbody curve control is performed. On the other hand, when the infrared cut filter 21 is disposed at the external position B (at a time of night-shot picture taking), the blackbody curve data LB obtained by taking the infrared component into consideration is read and the blackbody curve control is performed. Thereby optimum white balance control is performed according to picture taking conditions. When the light source is on the blackbody curve data LA or LB, in particular, it is possible to adjust the color balance with high accuracy.

Another white balance control process will next be described with reference to a flowchart of FIG. 11. Before starting this process, the microcomputer 58 retains in advance the blackbody curve data LA (FIG. 9) as a microcomputer table at a time of normal picture taking.

A process of steps S21 to S23 is the same as the above-described process of steps S11 to S13 in FIG. 10, and therefore description thereof will be omitted. Specifically, when the microcomputer 58 determines that the infrared cut filter 21 is disposed at the optical axis position A, the normal blackbody curve data LA (FIG. 9) is read, optimum gains are calculated such that ratios (R/G and B/G) between integral values of video signals R, G, and B become the same as the RGB ratio of the blackbody curve data LA, and blackbody curve control on the video signals R, G, and B is performed on the basis of a result of the calculation.

When the microcomputer 58 determines in step S21 that the infrared cut filter 21 is not disposed at the optical axis position A, that is, that the infrared cut filter 21 is disposed at the external position B, the process proceeds to step S24, where the microcomputer 58 calculates respective integral values of video signals R, G, and B on the basis of a detection result (color information within a screen) supplied from the OPD circuit 57. Further, the microcomputer 58 calculates integral value ratios (R/G and B/G). In step S25, the microcomputer 58 then calculates respective optimum gains for the video signals R, G, and B so that the integral value ratios (R/G and B/G) calculated by the process of step S24 become one. The microcomputer 58 supplies a result of the calculation as a control signal to the white balance amplifier circuit 59. On the basis of the control signal supplied from the microcomputer 58, the white balance amplifier circuit 59 performs gray world control so that the integral value ratios of the video signals R, G, and B become one.

Thus, when the infrared cut filter 21 is disposed at the optical axis position A (at a time of normal picture taking), the blackbody curve data LA is read and the blackbody curve control is performed. On the other hand, when the infrared cut filter 21 is disposed at the external position B (at a time of night-shot picture taking), the gray world control is effected so that the ratio between the video signals R, G, and B becomes one. Thereby optimum white balance control is performed according to picture taking conditions. This process is suitable especially when a color deviation is small. In addition, unlike the above-described process of FIG. 10, this process does not require the microcomputer 58 to retain the two kinds of blackbody curve data LA and LB in advance.

Another white balance control process will next be described with reference to a flowchart of FIG. 12. Before starting this process, the microcomputer 58 retains in advance the blackbody curve data LA (FIG. 9) as a microcomputer table at a time of normal picture taking.

A process of steps S31 to S33 is the same as the above-described process of steps S11 to S13 in FIG. 10, and therefore description thereof will be omitted. Specifically, when the microcomputer 58 determines that the infrared cut filter 21 is disposed at the optical axis position A, the normal blackbody curve data LA (FIG. 9) is read, optimum gains are calculated such that ratios (R/G and B/G) between integral values of video signals R, G, and B become the same as the RGB ratio of the blackbody curve data LA, and blackbody curve control on the video signals R, G, and B is performed on the basis of a result of the calculation.

When the microcomputer 58 determines in step S31 that the infrared cut filter 21 is not disposed at the optical axis position A, that is, that the infrared cut filter 21 is disposed at the external position B, the process proceeds to step S34, where the microcomputer 58 calculates respective integral values of video signals R, G, and B of a region of high luminance levels higher than a predetermined level on the basis of a detection result (color information within a screen) supplied from the OPD circuit 57. Further, the microcomputer 58 calculates integral value ratios (R/G and B/G).

Since there is a strong possibility that a part at a high luminance level is white (color of a light source), gray world control is performed on video signals R, G, and B of a region of high luminance levels higher than a predetermined level. Incidentally, the region of high luminance levels higher than the predetermined level refers to luminance levels of a high luminance part whose frequency distribution accounts for 5% in a frequency distribution of luminance of the entire screen, for example. This high luminance level region can be set or changed arbitrarily.

In step S35, the microcomputer 58 then calculates respective optimum gains for the video signals R, G, and B so that the integral value ratios (R/G and B/G) calculated by the process of step S34 become one. The microcomputer 58 supplies a result of the calculation as a control signal to the white balance amplifier circuit 59. On the basis of the control signal supplied from the microcomputer 58, the white balance amplifier circuit 59 performs gray world control so that the integral value ratios of the video signals R, G, and B become one.

Thus, when the infrared cut filter 21 is disposed at the optical axis position A (at a time of normal picture taking), the blackbody curve data LA is read and the blackbody curve control is performed. On the other hand, when the infrared cut filter 21 is disposed at the external position B (at a time of night-shot picture taking), the gray world control is effected so that the ratio between the integral values of the video signals R, G, and B of the high luminance level region becomes one. Thereby optimum white balance control is performed according to picture taking conditions. This process results in a smaller shift in color balance even when there is a color deviation, as compared with the above-described process of FIG. 11.

Another white balance control process will next be described with reference to a flowchart of FIG. 13. Before starting this process, the microcomputer 58 retains in advance the blackbody curve data LA (FIG. 9) as a microcomputer table at a time of normal picture taking.

A process of steps S41 to S43 is the same as the above-described process of steps S11 to S13 in FIG. 10, and therefore description thereof will be omitted. Specifically, when the microcomputer 58 determines that the infrared cut filter 21 is disposed at the optical axis position A, the normal blackbody curve data LA (FIG. 9) is read, optimum gains are calculated such that ratios (R/G and B/G) between integral values of video signals R, G, and B become the same as the RGB ratio of the blackbody curve data LA, and blackbody curve control on the video signals R, G, and B is performed on the basis of a result of the calculation.

When the microcomputer 58 determines in step S41 that the infrared cut filter 21 is not disposed at the optical axis position A, that is, that the infrared cut filter 21 is disposed at the external position B, the microcomputer 58 determines that it is a time of night-shot picture taking, and the process proceeds to step S44, where the microcomputer 58 calculates respective integral values of video signals R, G, and B of a region of medium luminance levels higher than a predetermined level and lower than a saturation luminance level on the basis of a detection result (color information within a screen) supplied from the OPD circuit 57. Further, the microcomputer 58 calculates integral value ratios (R/G and B/G).

Since there is a strong possibility that signals are saturated in a part at a very high luminance level, gray world control is performed on video signals R, G, and B of a region of medium luminance levels higher than a predetermined level and lower than a saturation luminance level. Incidentally, the region of medium luminance levels higher than the predetermined level and lower than the saturation luminance level refers to luminance levels excluding luminance levels of a high luminance part whose frequency distribution accounts for 5% in a frequency distribution of luminance of the entire screen and luminance levels of a low luminance part whose frequency distribution accounts for 20% in the frequency distribution of luminance of the entire screen, for example. This medium luminance level region can be set or changed arbitrarily.

In step S45, the microcomputer 58 then calculates respective optimum gains for the video signals R, G, and B so that the integral value ratios (R/G and B/G) calculated by the process of step S44 become one. The microcomputer 58 supplies a result of the calculation as a control signal to the white balance amplifier circuit 59. On the basis of the control signal supplied from the microcomputer 58, the white balance amplifier circuit 59 performs gray world control so that the integral value ratios of the video signals R, G, and B become one.

Thus, when the infrared cut filter 21 is disposed at the optical axis position A (at a time of normal picture taking), the blackbody curve data LA is read and the blackbody curve control is performed. On the other hand, when the infrared cut filter 21 is disposed at the external position B (at a time of night-shot picture taking), the gray world control is effected so that the ratio between the integral values of the video signals R, G, and B of the medium luminance level region becomes one. Thereby optimum white balance control is performed according to picture taking conditions. This process results in a smaller shift in color balance even when there are many saturation luminance levels, as compared with the above-described process of FIG. 12.

As described above, the microcomputer 58 detects presence or absence of the infrared cut filter 21 on the basis of an on state or an off state of the switch 52. When the infrared cut filter 21 is disposed at the optical axis position A (at a time of normal picture taking), the normal blackbody curve control is performed. When the infrared cut filter 21 is disposed at the external position B (at a time of night-shot picture taking), the blackbody curve control taking the infrared component into consideration is performed, or the gray world control is performed according to luminance levels. In other words, a method of controlling a white balance is changed according to whether the infrared cut filter 21 is present or not. It is thereby possible to realize natural color reproduction of the camera even when an infrared component is present.

The present invention can be effectively applied particularly to subjects in night views, at twilight, and under a dim fluorescent light, heavenly bodies and the like to thereby realize natural color reproduction of the camera and improve sensitivity.

While in the above description, the white balance control method is changed according to whether the infrared cut filter 21 is present or not, the present invention is not limited to this. For example, using an ND (Neutral Density) filter or another filter that changes light separation, the white balance control method can be changed according to whether the filter is present or not. Incidentally, also in this case, by performing gray world control at a time of night-shot picture taking as described above with reference to the flowcharts of FIGS. 11 to 13, the microcomputer 58 can realize natural color reproduction of the camera without retaining new blackbody curve data adjusted to the filter with an infrared component taken into consideration.

Further, while achromatization is conventionally performed (monochrome output is produced) because of noticeable color noise at a time of low illuminance, the present invention does not perform achromatization (produces color output) at a time of low illuminance because of increased sensitivity and non-noticeable color noise at a time of low illuminance. The present invention thus makes it possible to realize more natural color reproduction.

The series of processes described above can be carried out not only by hardware but also by software. When the series of processes is to be carried out by software, a program comprising the software is installed from a network or a recording medium onto a computer incorporated in special hardware, or onto for example a general-purpose personal computer that can perform various functions by installing various programs thereon.

Figure 14:
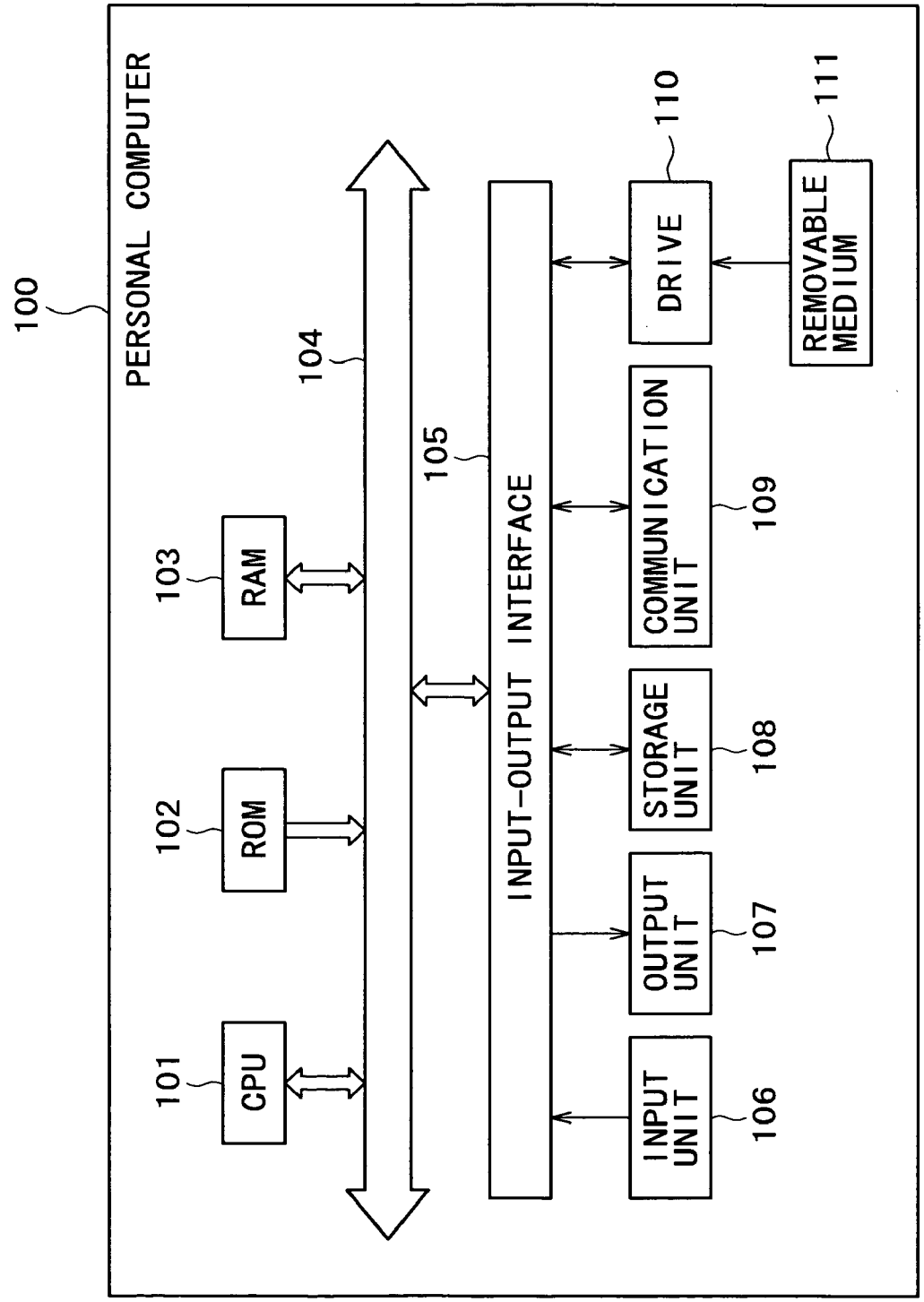
FIG. 14 is a block diagram showing an example of configuration of a general-purpose personal computer.

FIG. 14 is a diagram showing an example of internal configuration of a general-purpose personal computer 100. A CPU (Central Processing Unit) 101 performs various processing according to a program stored in a ROM (Read Only Memory) 102 or a program loaded into a RAM (Random Access Memory) 103 from a storage unit 108. The RAM 103 also stores data and the like necessary for the CPU 101 to perform the various processing, as required.

The CPU 101, the ROM 102, and the RAM 103 are connected to each other via a bus 104. The bus 104 is also connected with an input-output interface 105.

The input-output interface 105 is connected with an input unit 106 comprising a keyboard, a mouse and the like, an output unit 107 comprising a display and the like, a storage unit 108, and a communication unit 109. The communication unit 109 performs communication processing via a network.

When necessary, the input-output interface 105 is also connected with a drive 110, into which a removable medium 111 such as a magnetic disk, an optical disk, a magneto-optical disk, a semiconductor memory or the like is inserted as required. A computer program read from the removable medium 111 is installed in the storage unit 108 as required.

As shown in FIG. 14, the recording medium on which the program to be installed onto the computer and set in a state of being executable by the computer is recorded is not only formed by the removable medium 111 distributed to users to provide the program separately from the apparatus proper, the removable medium 111 comprising a magnetic disk (including flexible disks), an optical disk (including CD-ROM (Compact Disk-Read Only Memory) and DVD (Digital Versatile Disk)), a magneto-optical disk (including MD (Mini-Disk) (trademark)), a semiconductor memory or the like which has the program recorded thereon, but also formed by the ROM 103, a hard disk included in the storage unit 108, or the like which has the program recorded thereon and is provided to the user in a state of being preincorporated in the apparatus proper.

It is to be noted that in the present specification, the steps describing the program stored on the recording medium include not only processing carried out in time series in the included order but also processing carried out in parallel or individually and not necessarily in time series.

What is claimed is:

1. An image pickup device comprising:
    a first detecting unit configured to detect a position of a filter for changing light separation;
    a second detecting unit configured to detect color components red (R), green (G), and blue (B) from a video signal obtained by picture taking;
    a calculating unit configured to calculate respective integral values of the color components red (R), green (G), and blue (B) from the video signal as detected by the second detecting unit and to provide a control signal corresponding to the calculated respective integral values of the color components; and
    a white balance controlling unit configured to perform white balance control on a basis of the position of said filter detected by said first detecting unit;
    wherein when the first detecting unit detects that the filter is at a position of an optical axis, the white balance controlling unit performs control based upon blackbody curve data of only a visible light component,
    wherein when the first detecting unit detects that the filter is at an external position off the optical axis, the white balance controlling unit performs control based upon blackbody curve data obtained by taking an infrared component into consideration, and
    wherein when said first detecting unit detects that said filter is at the external position off the optical axis, said white balance controlling unit performs control such that a ratio between integral values of the color components from the video signal obtained by picture taking becomes a ratio between integral values of video signals based on a white subject taking an infrared component into consideration.

2. An image pickup device comprising:
a first detecting unit configured to detect a position of a filter for changing light separation;
a second detecting unit configured to detect color components red (R), green (G), and blue (B) from a video signal obtained by picture taking;
a calculating unit configured to calculate respective integral values of the color components red (R), green (G), and blue (B) from the video signal as detected by the second detecting unit and to provide a control signal corresponding to the calculated respective integral values of the color components; and
a white balance controlling unit configured to perform white balance control on a basis of the position of said filter detected by said first detecting unit;
wherein when the first detecting unit detects that the filter is at a position of an optical axis, the white balance controlling unit performs control based upon blackbody curve data of only a visible light component, and
wherein when the first detecting unit detects that the filter is at an external position off the optical axis, the white balance controlling unit performs control based upon blackbody curve data obtained by taking an infrared component into consideration.

3. An image pickup device as claimed in claim 2, wherein said controlling unit performs control such that a ratio between integral values of the color components of a high-luminance portion of said video signal becomes one.

4. An image pickup device as claimed in claim 2, wherein said controlling unit performs control such that a ratio between integral values of the color components of a predetermined luminance range portion of said video signal becomes one.

5. An image pickup device as claimed in claim 2, wherein when said first detecting unit detects that said filter is at the external position off the optical axis, said white balance controlling unit avoids performing low-illuminance achromatization.

6. An image pickup device as claimed in claim 2, wherein when said first detecting unit detects that said filter is at the external position off the optical axis, said white balance controlling unit performs a gray world control based upon the control signal provided by the calculating unit, such that a ratio (R/G) between the integral values of the R component and the G component and a ratio (B/G) between the integral values of the B component and the G component from the video signal obtained by picture taking become one.

7. An image pickup method, comprising the steps of:
detecting a position of a filter for changing light separation;
detecting color components red (R), green (G), and blue (B) from a video signal obtained by picture taking;
calculating, with a calculating unit, respective integral values of the color components red (R), green (G), and blue (B) from the video signal obtained by picture taking and providing a control signal corresponding to the calculated respective integral values of the color components; and
performing white balance control on a basis of the detected position of said filter, wherein when the filter is detected to be at a position of an optical axis, the white balance control is performed based upon blackbody curve data of only a visible light component, and wherein when the filter is detected to be at an external position off the optical axis, the white balance control is performed based upon blackbody curve data obtained by taking an infrared component into consideration.

8. An image pickup method of claim 7,
wherein when said filter is detected at the external position off the optical axis, said performing white balance controls comprises performing a gray world control based upon the control signal provided by the calculating unit, such that a ratio (R/G) between the integral values of the R component and the G component and a ratio (B/G) between the integral values of the B component and the G component from the video signal obtained by picture taking become one.

9. An image pickup method as claimed in claim 7, wherein performing white balance control comprises performing control such that a ratio between integral values of the color components of a high-luminance portion of said video signal becomes one.

10. An image pickup method as claimed in claim 7, wherein performing white balance control comprises performing control such that a ratio between integral values of the color components of a predetermined luminance range portion of said video signal becomes one.

11. An image pickup device comprising:
first detecting means for detecting a position of a filter for changing light separation;
second detecting means for detecting color components red (R), green (G), and blue (B) from a video signal obtained by picture taking;
calculating means for calculating respective integral values of the color components red (R), green (G), and blue (B) from the video signal detected by the second detecting means, and for providing a control signal corresponding to the calculated respective integral values of the color components; and
white balance controlling means for performing white balance control on a basis of the position of said filter detected by said first detecting means, wherein when the first detecting means detects that the filter is at a position of an optical axis, the white balance controlling means performs control based upon blackbody curve data of only a visible light component, and
wherein when the first detecting means detects that the filter is at an external position off the optical axis, the white balance controlling means performs control based upon blackbody curve data obtained by taking an infrared component into consideration.

12. An image pickup device of claim 11, comprising:
wherein when said first detecting means detects that said filter is at the external position off the optical axis, said white balance controlling means performs a gray world control based upon the control signal provided by the calculating means, such that a ratio (R/G) between the integral values of the R component and the G component and a ratio (B/G) between the integral values of the B component and the G component from the video signal obtained by picture taking become one.

13. An image pickup device as claimed in claim 11, wherein said controlling means performs control such that a ratio between integral values of the color components of a high-luminance portion of said video signal becomes one.

14. An image pickup device as claimed in claim 11, wherein said controlling means performs control such that a ratio between integral values of the color components of a predetermined luminance range portion of said video signal becomes one.

* * * * *